United States Patent [19]
Crouch, Jr.

[11] 3,832,452
[45] Aug. 27, 1974

[54] PURIFICATION OF ANHYDROUS ALUMINUM CHLORIDE IN SITU IN A SALT MELT

[76] Inventor: Dell A. Crouch, Jr., Village of Pennbrook, Levittown, Pa. 19053

[22] Filed: Apr. 10, 1973

[21] Appl. No.: 349,779

[52] U.S. Cl................ 423/495, 136/153, 423/463
[51] Int. Cl..................... H01m 11/00, Ho1m 9/00
[58] Field of Search............ 136/153, 161; 423/495, 423/463; 75/84.5

[56] References Cited
UNITED STATES PATENTS
1,818,839   8/1931   Brendley............................ 423/495
3,406,009   10/1968  Gould et al........................ 423/495
3,573,986   4/1971   Greenberg...................... 136/153 X
3,607,407   9/1971   Adams................................ 136/153

Primary Examiner—Winston A. Douglas
Assistant Examiner—John F. Niebling

[57]              ABSTRACT

Purification of anhydrous aluminum chloride in an alkaline metal chloride-aluminum chloride melt can be effected in situ by the addition of solid alkali metal to the melt.

6 Claims, No Drawings

PURIFICATION OF ANHYDROUS ALUMINUM CHLORIDE IN SITU IN A SALT MELT

BACKGROUND OF THE INVENTION

1. Field of the Invention

This invention relates to a process for the purification of anhydrous aluminum chloride in alkali metal chloride-aluminum chloride melts. More particularly, it relates to an improved purification of reagent grade anhydrous aluminum chloride in situ in an alkali metal chloride-aluminum chloride melt by the addition of a small amount of solid alkali metal to the alkali metal chloride-aluminum chloride melt.

Such melts are frequently utilized as electrolytes in molten salt batteries.

2. Description of the Prior Art

The use of molten or fused salts as electrolytes in secondary batteries is not new to the art. Such batteries generally utilize as the electrolyte an inorganic salt composition which is solid and non-conducting at ordinary temperatures. However, when the cell is activated by heating it to temperatures sufficiently high to fuse or melt the electrolyte, the molten electrolyte becomes conductive so that electrical energy may be withdrawn therefrom.

A problem which frequently arises when such molten salt electrolytes are utilized is that the self-discharge current of the electrodes employed therein is frequently too high, resulting in an unacceptable coulombic efficiency and making the measurement of the true storage capacity of the electrodes difficult if not impossible. This disadvantage is a manifestation of the impurities present in at least one of the salts utilized in the electrolyte melt. It is, therefore, preferable in the selection or preparation of the ingredients for the electrolyte melt that impurities that may cause self-discharge be minimized.

A salt frequently employed in the preparation of electrolyte melts for molten salt batteries is reagent grade $AlCl_3$. The major impurities to be removed from reagent grade aluminum chloride are water and iron. Various methods have been described for the purification of reagent grade anhydrous aluminum chloride which is to be utilized in the electrolyte melts of molten salt batteries. One such method involves the sublimation of aluminum chloride but this method is extremely time-consuming.

Another art-known process involves the treatment of electrolyte melt by the addition of magnesium metal in order to purify the reagent grade aluminum chloride of the melt. This method, however, necessitates an additional step of either filtration or sublimation. In this process the magnesium displaces and precipitates iron metal which is then filtered out of the melt.

Giner and Holleck (NASA, NAS–12–688 [1969]) in another process added magnesium to an alkali metal-chloroaluminate melt as a preliminary step in a sublimation process.

A novel process has now been discovered for the purification of reagent grade anhydrous aluminum chloride in situ in the molten salt melts. This process eliminates the necessity of a filtration step; is economical to operate; is readily automatable and is extremely effective.

SUMMARY OF THE INVENTION

This invention is directed to a novel process for the purification of reagent grade aluminum chloride in situ in an alkali metal chloride-aluminum chloride melt and consequently purification of the melt itself. In a process for the production of an alkali metal chloride-aluminum chloride melt by heating to its melting point a mixture of powdered alkali metal chloride and reagent grade aluminim chloride, the improvement manifested by this invention comprises purifying the reagent grade aluminum chloride in situ within the melt by adding alkali metal to the melt in an amount sufficient to react with the impurities present in said aluminum chloride. The alkali metal added to the melt is the same as the alkali metal of the alkali metal chloride present in the melt.

DESCRIPTION OF THE INVENTION

Molten or fused salts which are utilized as electrolytes in secondary molten salt batteries may be readily prepared by various means. For example, in the preparation of an alkali metal chloraluminate electrolyte, powdered alkali metal chloride may be mixed with reagent grade aluminum chloride and the resulting mixture is heated until it melts and ions of alkali metal chloraluminate are formed. As has been stated previously, it is preferable in the selection or preparation of the ingredients of this electrolyte melt, that impurities which may cause self-discharge be minimized.

It has now been discovered that improved purification of reagent grade anhydrous aluminum chloride in the alkali metal chloride-aluminum chloride melt can be effected in situ by the addition of a small amount of solid alkali metal to the alkali metal chloride-aluminum chloride melt. The result is a purification of the aluminum chloride and a consequent purification of the melt of which it is a part. The alkali metal added will be the same as the alkali metal of the alkali metal chloride in the melt, e.g., sodium, lithium, or potassium.

This process operates on the single replacement mechanism but unlike the process involving the addition of magnesium to the melt, this process does not introduce into the melt a new ionic species.

Reactions which occur during the purification are, for example:

$$3Na + AlCl_3 \rightarrow 3NaCl + Al$$

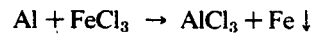

$$Al + FeCl_3 \rightarrow AlCl_3 + Fe \downarrow$$

The amount of alkali metal added to the melt will depend upon the purity of the particular reagent grade anhydrous aluminum chloride employed. It need only be assured that sufficient alkali metal is added to react with the impurities in the $AlCl_3$. This amount can readily be determined by simple calculation knowing the weight percent of the impurities present in the $AlCl_3$. The following is a sample calculation which shows such a means to determine the minimum amount of sodium to be added to a NaCl- $AlCl_3$ melt.

Typical assay of Baker analyzed reagent grade anhydrous $AlCl_3$ – 99.1 percent $AlCl_3$. The balance consists of impurities such as heavy metal salts, the majority being $FeCl_3$.

Recalling the equation above,

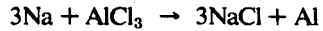

$$3Na + AlCl_3 \rightarrow 3NaCl + Al$$

$$Al + FeCl_3 \rightarrow AlCl_3 + Fe \downarrow$$

For every mole of $FeCl_3$ to be removed, 3 moles of sodium must be added.

Assuming the preparation of a 100g melt whose desired final composition is to be 75 percent $AlCl_3$ and 25 percent NaCl by weight, if both components were pure 75g of $AlCl_3$ and 25g of NaCl would be weighed out, however, the $AlCl_3$ is not pure and must be compensated for. Therefore, the weight of the raw $AlCl_3$ material must be increased to obtain the desired composition in the final product. $(75/0.991) = 75.7g$ of reagent grade $AlCl_3$ needed to give 75g of $AlCl_3$ in the final melt.

It is now necessary to rid the melt of the 0.7g of impurities. Assuming that all of the 0.7g is $FeCl_3$, the number of moles of $FeCl_3$ present $= 0.7g\ FeCl_3/162.2$ g/mole $= 4.3 \times 10^{-3}$ moles. Since 3 moles of Na reacts with 1 mole $FeCl_3$, the amount of Na which must be added to remove the $FeCl_3$ is $4.3 \times 10^{-3} \times 3$ moles Na/1 mole $FeCl_3 = 0.012$ moles Na.

Converting this to grams of Na, 0.012 moles Na $\times$ 23g/mole $= 0.3g$ Na must be added to remove the 0.7g of $FeCl_3$. Recalling again the equation $3Na + AlCl_3 \rightarrow 3NaCl + Al$, and the fact that no new ionic species are introduced into the melt by the process of this invention, it becomes clear that the addition of 0.3g Na will produce some NaCl in situ, i.e., 0.012 moles of Na will produce 0.012 moles of NaCl and 0.012 moles NaCl $\times$ 58.5g/mole $= 0.7g$ NaCl produced during the purification process.

Since the desired melt is to contain 75 wt. percent $AlCl_3$ and 25 wt. percent NaCl, the initial amount of NaCl introduced into the melt should therefore be reduced by 0.7g giving starting materials of 75.7g $AlCl_3$ and 24.3g NaCl. During the purification process described above, 0.3g of Na will be added and this will remove 0.7g of impurities from the starting $AlCl_3$ material and at the same time produce 0.7g of NaCl thus giving the desired end melt product of 75 wt. percent essentially pure $AlCl_3$ and 25 wt. percent essentially pure NaCl. To insure the removal of all the impurities from the $AlCl_3$ a slight excess of the alkali metal may be added to the melt.

While the equations listed above illustrate the removal of iron from reagent grade anhydrous aluminum chloride, it should be noted that $FeCl_3$ is but one example of the undesirable impurities removed by this process.

By purification as used herein is meant that the process of this invention removes from the reagent grade anhydrous $AlCl_3$ and therefore from the melt those elements which in their ionic forms would cause cell self-discharge in cells using this melt, i.e., those reversible impurities which have more than one valence state and which are more electronegative than aluminum. Such elements include cadmium, iron, copper, manganese and the like.

The reacted impurities, e.g. the iron and other impurities precipitate from the electrolyte melt upon the addition of the alkali metal and sink to the bottom of the melt-containing vessel. There is left at the top of the vessel a clear, colorless alkali metal chloride-aluminum chloride melt. This clear melt can be decanted into the cell without additional filtration, i.e., it may be poured directly from the melt preparation container.

The melts resulting from the process of this invention manifest improved capacity and a coulombic efficiency of as high as 98 percent since reversible impurities which can cause self-discharge are removed from the melt by this process.

As an example, a cell utilizing a sodium chloroaluminate melt purified by the process of this invention and having a PO2 carbon positive current collector (Pure Carbon Co, dense amorphous carbon) was recycled at the ten hour rate at 190° C and constant current. The same current was used for charge and discharge:

$I$ = current in mA
$t_d$ = time on discharge
$t_c$ = time on charge
$It_d = Q_d$ = charge removed on discharge
$It_c = Q_c$ = charge put in on charge
$Q_d/Q_c \times 100$ = coulombic efficiency Since the same current was used on charge and discharge (2 mA), $Q_d/Q_c \times 100 = It_d/It_c \times 100 = t_d/t_c \times 100$ = coulombic efficiency Time on discharge was 9.4 hours and time on charge was 9.6 hours therefore $9.4/9.6 \times 100 = 98$ percent coulombic efficiency The capacitance (F/gm) of the positive electrode was 70.

The foregoing detailed description has been given for clarity of understanding only and no unnecessary limitations are to be understood therefrom. The invention is not limited to the exact details shown and described for obvious modifications will occur to one skilled in the art.

The embodiments of the invention in which an exclusive property or privilege is claimed are defined as follows:

1. In a process for the production of an alkali metal chloride-aluminum chloride melt by heating to its melting point a mixture of alkali metal chloride and reagent grade aluminum chloride, the improvement which comprises purifying the reagent grade aluminum chloride in situ within the melt by adding alkali metal to the melt in an amount sufficient to react with the impurities present in said aluminum chloride, wherein the alkali metal added is the same as the alkali metal of the alkali metal chloride present in the melt.

2. A process according to claim 1 wherein an excess of alkali metal is added to the alkali metal chloride-aluminum chloride melt.

3. A process according to claim 1 wherein the alkali metal added is selected from the group consisting of sodium, potassium and lithium.

4. A process according to claim 3 wherein the alkali metal added is sodium.

5. A process according to claim 2 wherein the alkali metal added is selected from the group consisting of sodium, potassium and lithium.

6. A process according to claim 5 wherein the alkali metal added is sodium.

* * * * *